(12) United States Patent
Dicke et al.

(10) Patent No.: US 6,435,144 B1
(45) Date of Patent: Aug. 20, 2002

(54) FAN CONTROL SYSTEM AND METHOD FOR SIMULTANEOUS HEAT TRANSFER APPLICATION AND ENGINE ENCLOSURE VENTILATION

(75) Inventors: Paul A Dicke; Gary L Luster, both of Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/609,084

(22) Filed: Jun. 30, 2000

Related U.S. Application Data

(60) Provisional application No. 60/163,032, filed on Nov. 2, 1999.

(51) Int. Cl.[7] ................................................ F01P 7/02
(52) U.S. Cl. ..................... 123/41.12; 165/41; 180/68.4; 62/323.1
(58) Field of Search ............................ 123/41.66, 41.12, 123/41.65; 165/41, 51; 180/68.4, 68.1; 62/323.1

(56) References Cited

U.S. PATENT DOCUMENTS

| | | | |
|---|---|---|---|
| 3,837,149 A | 9/1974 | West et al. | |
| 3,866,580 A | 2/1975 | Whitehurst et al. | |
| 4,059,080 A | 11/1977 | Rudert | |
| 4,120,271 A | 10/1978 | Edmaier | |
| 4,202,296 A | 5/1980 | Nonnenmann et al. | |
| 4,241,702 A | 12/1980 | Takeuchi et al. | |
| 4,327,674 A | 5/1982 | Takei | |
| 4,815,550 A | 3/1989 | Mather et al. | |
| 4,854,278 A | 8/1989 | Honecker | |
| 4,964,383 A | 10/1990 | Shinno et al. | |
| 5,234,051 A | 8/1993 | Weizenburger et al. | |
| 5,689,953 A | 11/1997 | Yamashita et al. | |
| 5,709,175 A | 1/1998 | Carroll | |
| 5,828,967 A | 10/1998 | Ueda | |
| 6,129,056 A | * 10/2000 | Skeel et al. | ............... 123/41.49 |

* cited by examiner

*Primary Examiner*—Tony M. Argenbright
*Assistant Examiner*—Katrina B. Harris
(74) *Attorney, Agent, or Firm*—Blackwell Sanders Pepper Martin LLP

(57) ABSTRACT

A system for both providing air flow through a condenser core of an air conditioner and ventilating an engine compartment in a work machine. A control system for controlling the air flow through the condenser core and through the engine compartment includes a signal generating mechanism associated with the air conditioner operable to output a signal to the control system indicative of a desired fan speed, at least one sensor positioned in the engine compartment for determining the air temperature therein, and a controller coupled to the signal generating mechanism and to the at least one sensor for outputting a signal to the fan to control the speed thereof, the output signal being indicative of the highest fan speed dictated by the signals received from the signal generating mechanism and from the at least one sensor.

13 Claims, 6 Drawing Sheets

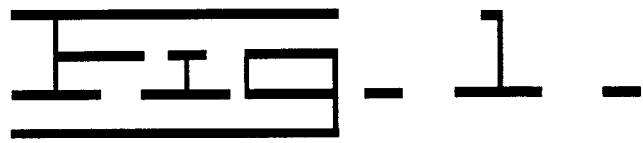
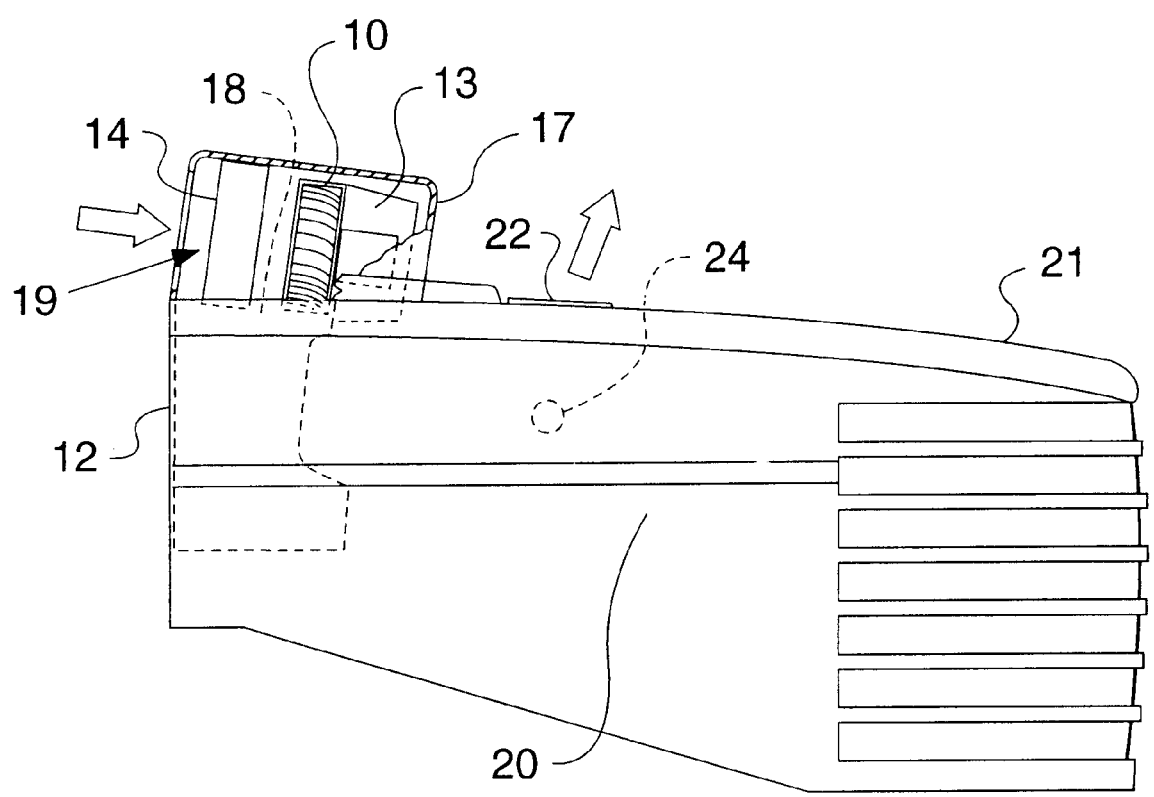

Fig_2_
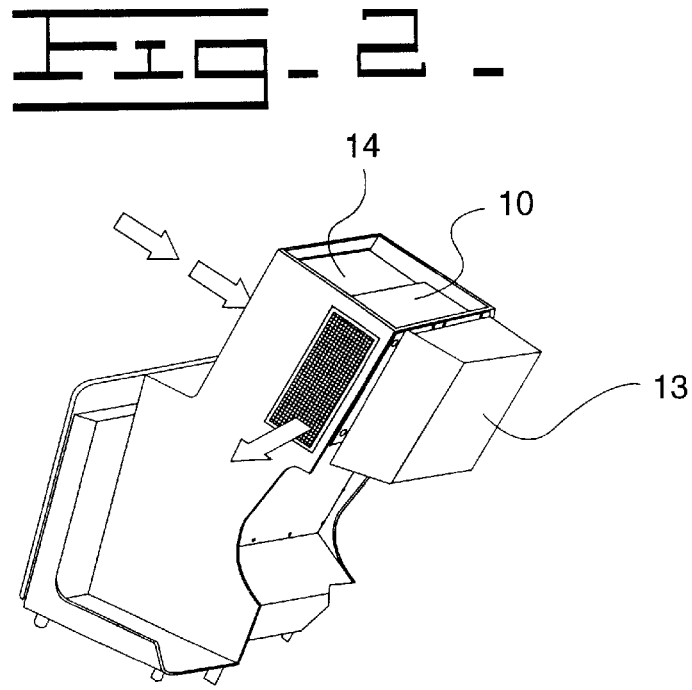
Fig_3_
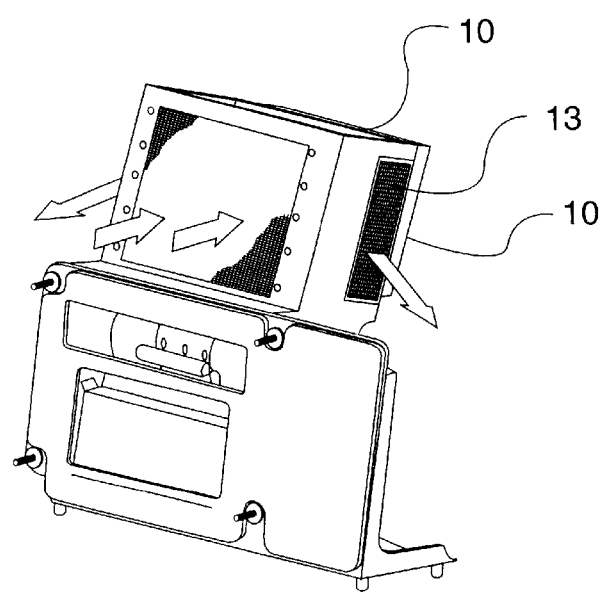

FAN SPEED VS ENCLOSURE AIR TEMP

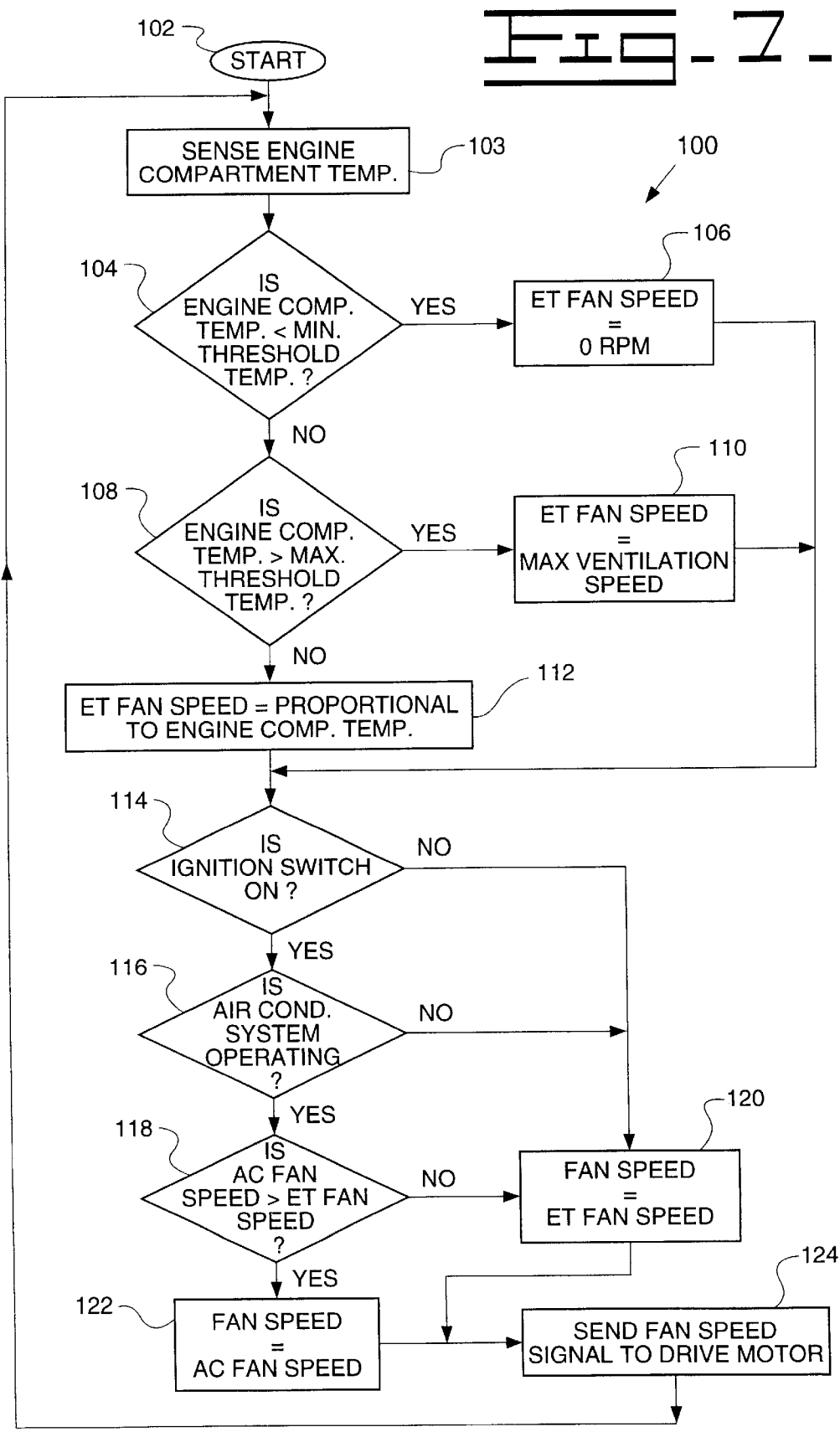

FAN CONTROL SYSTEM AND METHOD FOR SIMULTANEOUS HEAT TRANSFER APPLICATION AND ENGINE ENCLOSURE VENTILATION

This application claims the benefit of prior provisional patent application Ser. No. 60/163,032 filed Nov. 2, 1999.

TECHNICAL FIELD

This invention relates generally to the field of air conditioning and engine enclosure ventilating systems for heavy machinery such as construction, earthmoving and other types of work machines and, more particularly, to a single fan arrangement and control system for simultaneously cooling the air conditioner condenser and ventilating the engine enclosure associated with a particular work machine.

BACKGROUND ART

Construction and excavation machines as well as a wide variety of other types of work machines typically include an operator compartment or cab for controlling the operation of the machine. Because of the varied environments in which these work machines are utilized, many of these operator cab compartments are equipped with air conditioning systems. An essential component of any air conditioning system is a refrigerant condenser core which is used to transfer heat from the refrigerant to some other medium. In this regard, condenser cores typically require forced air flow to be directed through the condenser in order to enhance heat transfer therefrom, and therefore enhance the performance of the air conditioning system. This forced air flow helps to further remove heat from the condenser core and improves the overall efficiency of the air conditioning system.

Because of space limitations, a separate fan for forcing air through the air conditioning condenser is normally not provided. Instead, condenser cores are often placed in a primary cooling fan air stream along with many other heat exchangers such as the engine's radiator as well as hydraulic, transmission, and oil heat exchangers, all of which reduce the amount of heat transfer air flow through the air conditioning condenser core thereby reducing the effectiveness of the air conditioning system. This prior art arrangement also adds to the overall cooling system size, particularly the size and operational capability of the primary cooling fan, and such physical arrangement of the various cooling system components often times inhibits the operator's visibility from the cab compartment.

It is desirable to improve the effectiveness of a work machine's air conditioning system while at the same time minimizing the size of the equipment necessary to accomplish this task.

Another important and ever increasing need in work machines is engine enclosure ventilation in order to cool and maintain the temperature of the engine compartment below the critical temperature requirements of the various components installed therein. Additionally, noise regulations worldwide are requiring more noise-tight enclosures to attenuate engine noise. More noise-tight engine enclosures result in more air tight engine enclosures which, in turn, results in decreased natural air flow and decreased natural air circulation through the engine compartment to remove heat from the heat generating components. This results in decreased ventilation of the engine enclosure. In order to achieve a high noise-attenuated engine enclosure and still maintain the temperature requirements within such enclosure, a ventilation fan may be required to improve air circulation within the engine enclosure. Ventilation fans installed specifically to circumvent the engine enclosure ventilation problem, once again, add to the size of the overall cooling system.

It is therefore likewise desirable to improve the ventilation of the engine enclosure while at the same time minimizing the size of the cooling system necessary to accomplish this task.

Accordingly, the present invention is directed to overcoming one or more of the problems as set forth above.

DISCLOSURE OF THE INVENTION

In one aspect of the present invention, an apparatus for both increasing air flow through a heat transfer device and ventilating an engine compartment in a work machine is disclosed. The apparatus includes a fan positioned adjacent one end portion of the engine compartment, a heat exchanger device positioned adjacent to and upstream from the fan, and the fan creating air flow through the heat transfer device and through the engine compartment.

In another aspect of the present invention, a method for controlling the speed of a fan in a work machine, the work machine including a heat transfer device and an engine compartment, the fan being positioned between the heat transfer device and one end portion of the engine compartment is disclosed. The method comprising the steps of sensing a temperature in the engine compartment of the work machine, determining a fan speed based upon the temperature sensed in the engine compartment, sensing the operation of the heat transfer device, determining a fan speed based upon the operation of the heat transfer device, comparing the fan speed determined in the step of determining a fan speed based upon the temperature sensed in the engine compartment with the fan speed determined in the step of determining a fan speed based upon the operation of the heat transfer device, and setting the speed of the fan to the higher of the fan speeds determined in the step of determining a fan speed based upon the temperature sensed in the engine compartment and the step of determining a fan speed based upon the operation of the heat transfer device.

BRIEF DESCRIPTION OF THE DRAWINGS

For a better understanding of the present invention, reference may be made to the accompanying drawings in which:

FIG. 1 is a side elevational view of one embodiment of the present invention depicting an engine compartment of a work machine and further illustrating in fragmentary phantom outline the apparatus of the present invention positioned within the engine compartment;

FIG. 2 is a side perspective view of the apparatus of the present invention depicted in phantom outline in FIG. 1 showing the inter-positioning of the respect components associated therewith;

FIG. 3 is a front prospective view of the apparatus of FIG. 2;

FIG. 7 is a flow chart illustrating the steps for setting fan speed in one embodiment of the present invention.

BEST MODE FOR CARRYING OUT THE INVENTION

Figure 4:
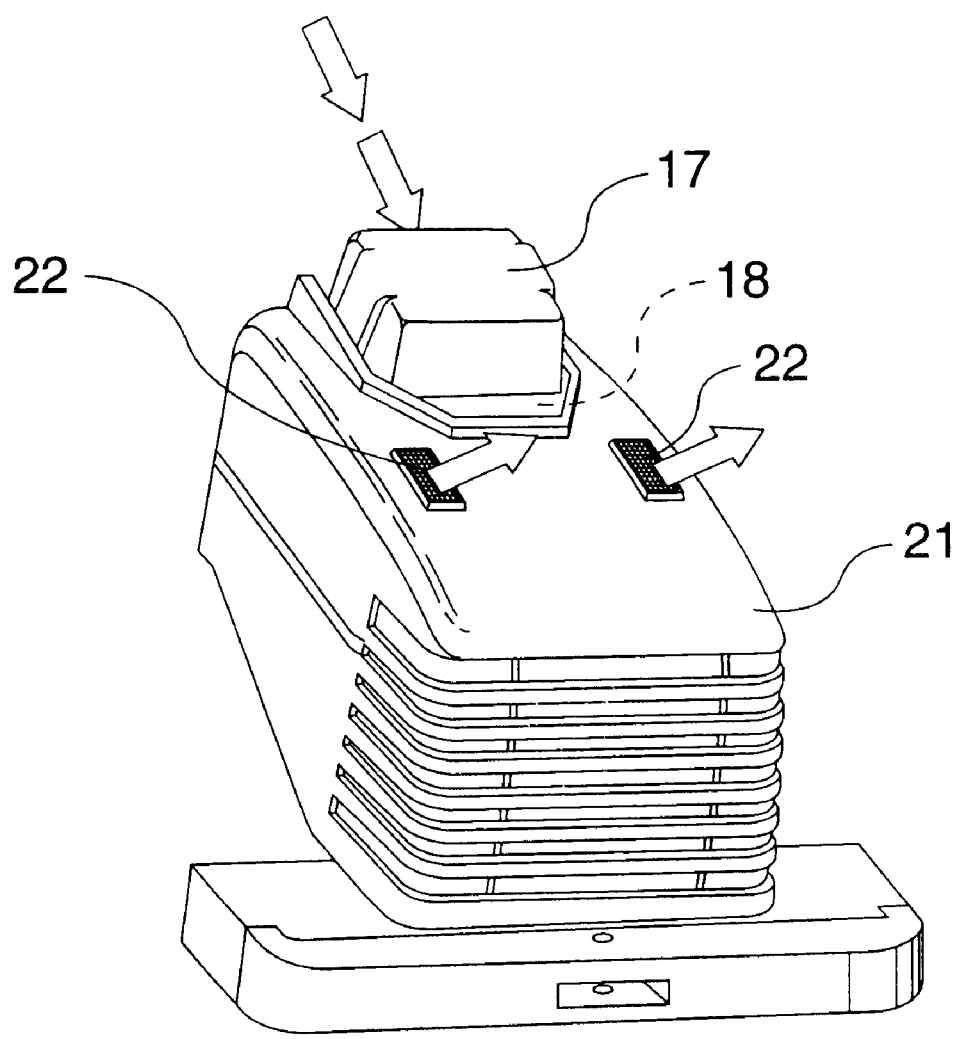
FIG. 4 is a front perspective view of the engine compartment of FIG. 1.

Referring to FIG. 1, in one embodiment incorporating the principles of the present invention a fan 10 is positioned and located adjacent one end portion 12 of an engine compartment 20 associated with a typical work engine so as to serve two distinct tasks, namely, to cool a heat transfer device such as the refrigerant condenser core 14 associated with a typical air conditioning system and to also ventilate the engine compartment 20. Fan 10 is preferably a radial fan, although an axial fan or other type of fan may also be utilized without departing from the sprit and scope of the present invention. Radial fan 10 operates to draw air into the front portion of the fan, and to expel air radially out of the fan as best shown in FIGS. 1 and 4.

Engine compartment 20 is enclosed by enclosure member 21 which includes a hood 17 which covers an opening 18 in member 21. The space 19 formed by opening 18 and the space under hood 17 provides a path for ambient air to flow from an exterior portion of engine compartment 20 to the fan 10. In this regard, fan 10 is positioned in close proximately to and facing the inlet to space 19 as best shown in FIG. 1 so as to be preferably in a direct line of sight with the inlet to space 19 and with condensor core 14 as will be hereinafter explained.

FIGS. 2 and 3 show the specific apparatus arrangement of fan 10 and the heat transfer refrigerant condenser core 14. More particularly, condenser core 14 is preferably installed upstream and substantially adjacent to the front of fan 10. When fan 10 is operating, air is drawn through condenser core 14 and into fan 10 thereby enhancing the heat transfer capability of condenser core 14. Although the present fan application is disclosed in operation with a heat transfer device associated with a typical air conditioning system, it is recognized and anticipated that heat transfer device 14 may be any one of a plurality of different types of heat exchangers utilized in a work machine such as an engine-oil cooling core or a hydraulic-fluid cooling core, and the present fan application can be adapted to cool the same.

As best illustrated in FIGS. 1 and 2, fan 10 includes a drive motor 13 operatively connected thereto for controlling the speed of fan 10. Drive motor 13 is preferably positioned behind fan 10, or in such other location, such that the motor 13 does not interfere with the air flow entering and leaving fan 10.

Engine compartment 20 will typically include the engine for the work machine along with various functional components (not shown) required for the operation of the machine such as hydraulic pumps, motors, other fans, other heat transfer devices and so forth. Engine compartment 20 also includes at least one, and preferably two, exit ducts 22 as shown in FIG. 4, the exit ducts 22 being positioned and located in the top portion of enclosure member 21 adjacent to the end portion of the engine compartment 20 opposite fan 10. Exit ducts 22 allow air communication between the interior and exterior of the engine compartment 20 and serve as a point of exit for air expelled into engine compartment 20 by fan 10. Engine compartment 20 also includes appropriate internal duct work (not shown) to guide the air flow expelled radially by fan 10 through the compartment 20 such that it comes into contact with the necessary functional components therein to help cool the same before the air exits engine compartment 20 through exit ducts 22.

Accordingly, when fan 10 is in operation, the fan 10 draws in ambient air through the inlet to space 19 and allows that air to first pass through condensor core 14, as shown by the arrows illustrated in FIGS. 2 and 3, thereby dissipating heat from condenser core 14 and cooling the same. This same air is then expelled radially by radial fan 10 into engine compartment 20 as likewise indicated by the arrows illustrated in FIGS. 2 and 3. The top portion of radial fan 10 is preferably covered such as by hood 17 so as to prevent air from flowing radially out through the top portion of the fan. Hood 17 therefore funnels the air expelled radially out of the top of fan 10 back down the sides of hood 17 so as to join the air being expelled radially through the sides and the bottom thereof. Once expelled from fan 10, this air is then guided by appropriate air duct means within engine compartment 20 to exit ducts 22. During this process, air comes into contact with the necessary functional components located within engine compartment 20 downstream from fan 10 which may need cooling, the air flow through compartment 20 thus providing ventilation thereto, and thus allowing heat dissipation from the compartment and the various functional components installed therein.

Operation of fan 10 is controlled by an electronic control module (ECM) 30, or some other controller or processor means capable of receiving and outputting signals as will be hereinafter explained. Electronic controllers or modules such as ECM 30 are commonly used in association with work machines for controlling and accomplishing various functions and tasks including monitoring and controlling a wide variety of engine functions such as engine speed and engine load. Controllers and electronic modules, such as ECM 30, are typically connected for delivering current control signals to devices such as control valves, pumps, actuators, motors and a wide variety of various other mechanical components for controlling the operation thereof. In this regard, ECM 30 will typically include processing means such as a microcontroller or microprocessor, associated electronic circuitry such as input/output circuitry, analog circuits or programmed logic arrays, as well as associated memory.

Figure 5:
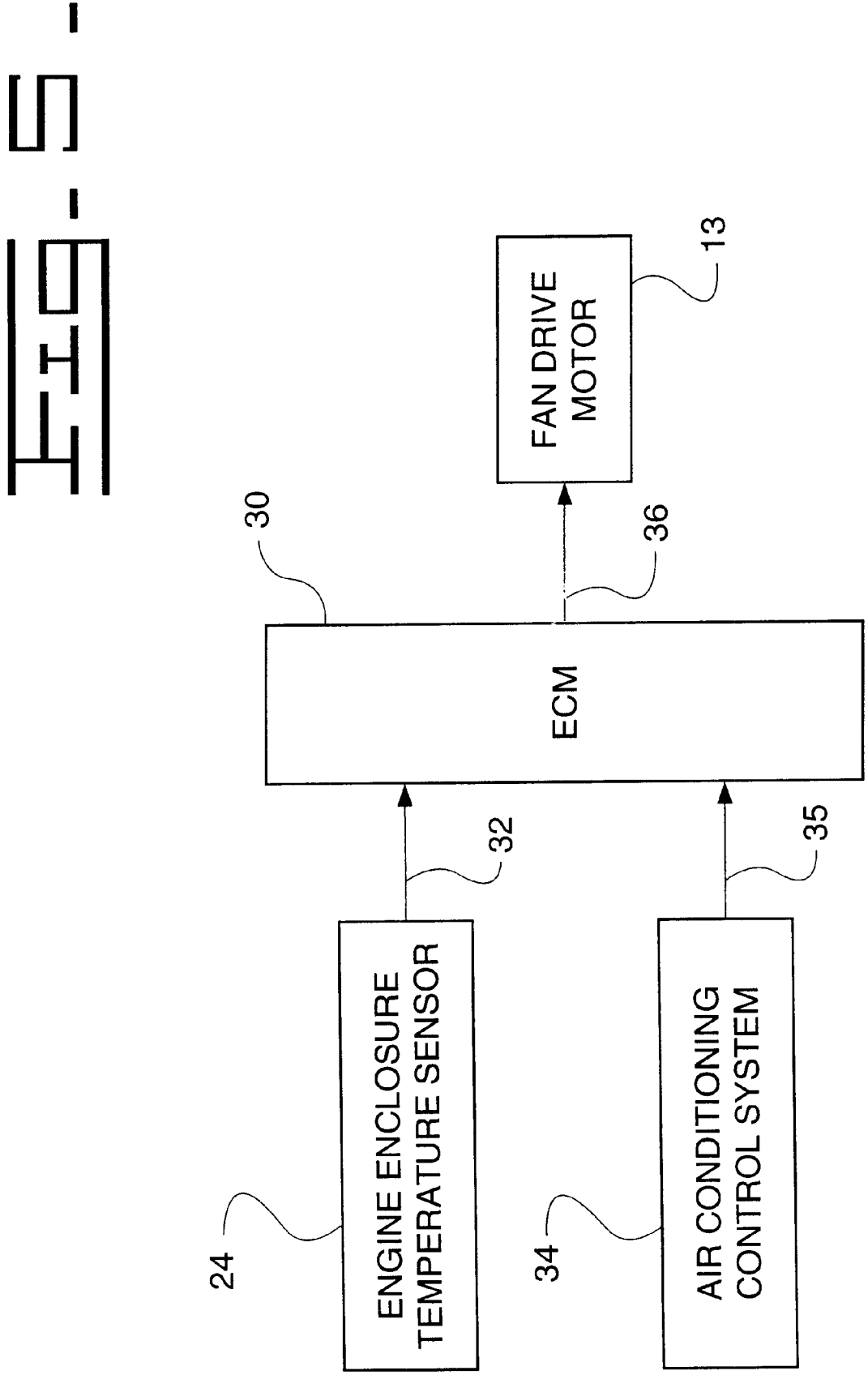
FIG. 5 is a schematic illustration of one embodiment of the electronic control system of the present invention.

The present fan control system also includes a temperature sensor 24 positioned and located within engine compartment 20, preferably proximate to the hottest component located therein, which component will vary depending upon the particular work machine. The sensor 24 monitors the temperature within the compartment 20, at least in the vicinity of sensor 24, and outputs an appropriate signal to ECM 30 indicative of such temperature. Although, it is contemplated and expected that temperature sensor 24 may be positioned anywhere within engine compartment 20, it is also recognized and anticipated that any plurality of sensors may be positioned within the compartment 20 for monitoring the temperatures in the vicinity of such sensors. As shown in FIG. 5, temperature sensor 24 provides a signal 32 to ECM 30 corresponding to the temperature at the sensor's location in engine compartment 20.

Figure 6:
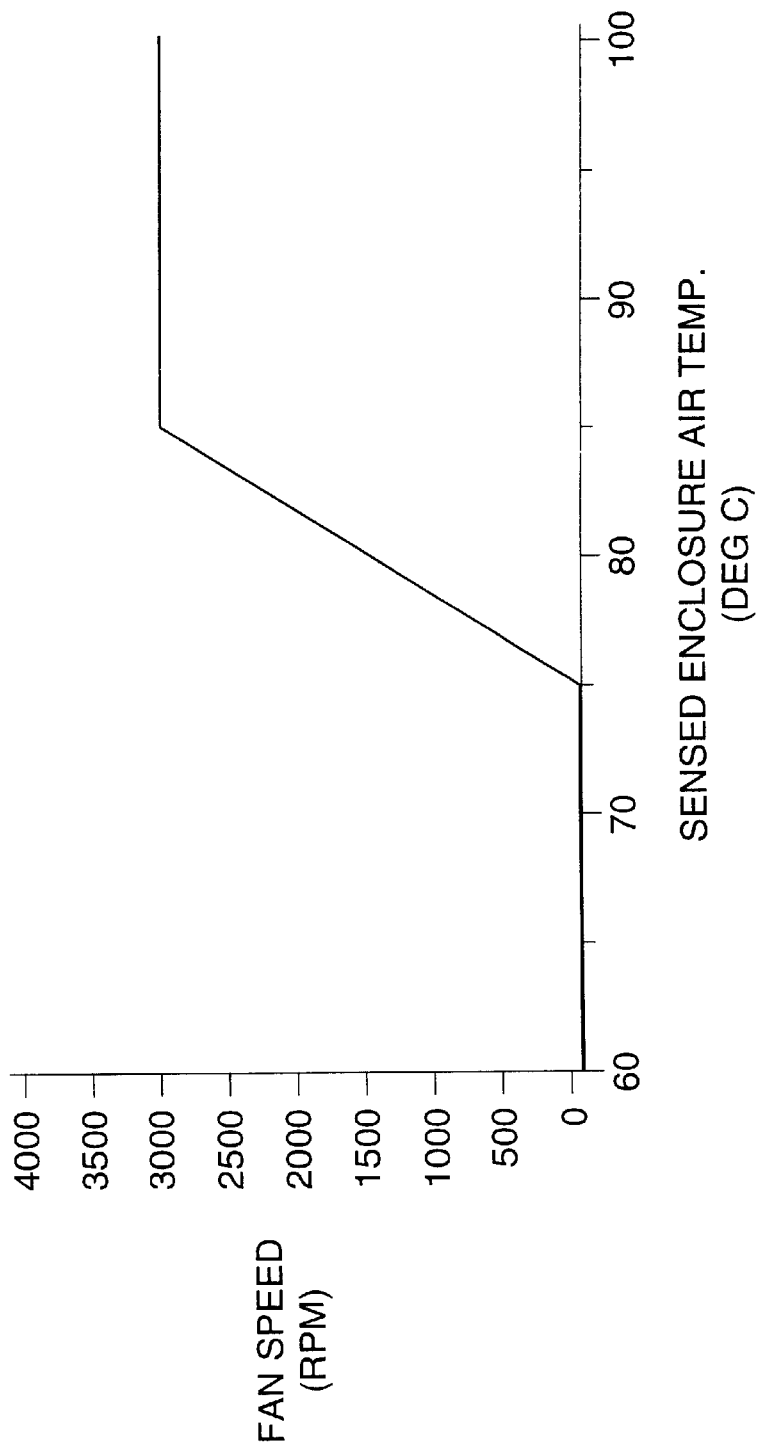
FIG. 6 is a graphical illustration showing the relationship between fan speed and engine compartment temperature in one embodiment of the present invention.

In response to signal 32, ECM 30 determines an engine temperature fan speed (ET fan speed) corresponding to the temperature sensed in engine compartment 20. In one embodiment of the present invention, ET fan speed is determined in accordance with the fan speed v. enclosure air temperature graph illustrated in FIG. 6. For example, referring to FIG. 6, if the temperature sensed by sensor 24 is at or below a minimum threshold temperature such as at or below about 75° C. (167° F.) as illustrated in FIG. 6, the ET fan speed for that temperature is a minimum fan speed of zero rpm. If the sensed temperature within engine compartment 20 is at or above the maximum threshold temperature of about 85° C. (185° F.) as indicative in FIG. 6, the ET fan speed for that temperature within engine compartment 20 is a maximum fan speed of about 3000 rpm. If the sensed temperature within engine compartment 20 is between the minimum threshold temperature and the maximum threshold temperature, the ET fan speed is determined as indicated by the graph in FIG. 6 based upon the straight line relationship between the minimum and maximum engine enclosure temperature. In this situation, the ET fan speed will be a proportional speed between zero and 3000 rpm based upon the straight line relationship illustrated in FIG. 6. This procedure may be implemented in one of various ways known to those skilled in the art, such as storing the relationship between engine enclosure temperature and fan speed into the memory associated with ECM 30 in a form of the graph illustrated in FIG. 6, in the form of a look-up table, or in the form of one or more equations designed to yield fan speed. Other means for determining fan speed based upon a sensed engine enclosure temperature are likewise possible.

A second signal 35 indicating a desired fan speed for cooling condenser core 14 is also provided to ECM 30 via the air conditioning control system 34 associated with the particular work machine. Signal 35 is generated by the air conditioning control system 34 based upon the position of the air conditioning controls located in the cab of the work machine, such controls dictating the requirements of the system and the heat transfer requirements of the condenser core 14. Based upon the setting of such air conditioning controls, the air conditioning control system 34 will determine the fan speed (AC fan speed) necessary for fan 10 to cool condenser core 14 and will output the appropriate signal 35 to ECM 30 indicative of such AC fan speed. Based upon ET and AC fan speeds, ECM 30 will output a signal 36 to the fan drive motor 13 to control the speed of fan 10, the output signal 36 being indicative of the highest fan speed, that is, the higher of the ET fan speed and the AC fan speed. The operating steps according to one aspect of the present invention for determining and implementing the appropriate fan speed are set forth in flow chart 100 illustrated in FIG. 7. These steps can be incorporated into the programming of the processing means of ECM 30 by techniques known to those skilled in the art.

The operating steps of flow chart 100 (FIG. 7) can be initiated when the ignition switched is turned on, or such operating steps can be programmed to run continuously based upon some predetermined repeat interval or other criteria. Once control loop 100 is initiated at step 102, the temperature in engine compartment 20 is sensed as described above at step 103. If the sensed engine compartment temperature is less than a minimum threshold temperature at 104, the ET fan speed is determined to be zero rpm at step 106, and ECM 30 proceeds to step 114. If, on the other hand, the sensed engine compartment temperature is greater than or equal to the minimum threshold temperature, ECM 30 will proceed to step 108 and will check to see whether the sensed temperature is greater than a maximum threshold temperature. If the sensed temperature is, in fact, greater than the maximum threshold temperature, ECM 30 will determine the ET fan speed to be the maximum ventilation fan speed at step 110 and ECM 30 will again proceed to step 114. If, at step 108, ECM 30 determines that the sensed engine compartment temperature is not greater than the maximum threshold temperature, ECM 30 will further determine that the sensed temperature is between the minimum threshold and the maximum threshold temperatures and will thereafter further determine the ET fan speed to be a proportional speed between the minimum and the maximum ventilation speed at step 112 such as in accordance with the relationship illustrated in FIG. 6.

Subsequent to determining the ET fan speed, ECM 30 will proceed to step 114 and determine whether the ignition switch is in the on position. If the ignition switch is not on, then ECM 30 will determine the desired fan speed to be the previously determined ET fan speed at step 120 and ECM 30 will proceed to step 124 and will output the appropriate signal 36 to the fan drive motor 13 to set the speed thereof. If, on the other hand, the ignition switch is on at step 114, ECM 30 will then proceed to step 116 to see if the air conditioning system is in operation. If the air conditioner is not operating at step 116, ECM 30 will again determine the desired fan speed to be the previously determined ET fan speed at step 120 and ECM 30 will again proceed to step 124 as previously explained. If, however, the air conditioning system is, in fact, running at step 116, ECM 30 will proceed to step 118 and will determine whether the AC fan speed (supplied by the air conditioning system 34) is greater than the previously determined ET fan speed. If the AC fan speed is greater, then the desired fan speed is determined to be the AC fan speed at step 122 and ECM 30 will proceed to output the appropriate signal 36 to the fan drive motor 13 to set the speed thereof at step 124. If, on the other hand, at step 118, the AC fan speed is less than or equal to the ET fan speed, the desired fan speed is determined to be the ET fan speed at step 120 and ECM 30 will again proceed to step 124 to output the appropriate signal. A signal 36 corresponding to the desired fan speed thus determined is then sent to the fan motor 13 at step 124 to control the speed of fan 10.

It is readily apparent from flow chart 100 that fan 10 may be operational even when the ignition switch is in the off position. This condition typically occurs when the sensed temperature in engine compartment 20 is greater than the minimum threshold temperature or some other predetermined temperature. This feature of flow chart 100 permits continuing air flow through engine compartment 20 by maintaining ventilation fan speed after the ignition switch is turned off in the event of a hot shutdown where components in engine compartment 20 need to cool down before fan operation is terminated. Preferably, ECM 30 allows fan 10 to continue to operate at the last determined desired fan speed if the sensed temperature is above a first predetermined temperature threshold. Fan 10 is then allowed to continue operating until the sensed temperature falls below a second predetermined threshold temperature. These additional operating steps defining first and second predetermined temperature thresholds for operating fan 10 after the ignition switch is turned off can be inserted into flow chart 100 after step 114 if the first and second predetermined temperatures are selected to be a temperature other than the minimum threshold temperature. It is also recognized that this feature is optional and step 114 can be eliminated.

Industrial Applicability

As described herein, the present apparatus, method and fan speed control system has particular utility in all types of work machines and other vehicles wherein engine compartment ventilation and cooling of heat transfer cores is required. The present apparatus and control system monitors both the temperature inside engine compartment 20 and operation of the machine's air conditioning system and controls the speed of the fan both servicing condenser core 14 and ventilating the engine compartment 20 based upon the highest of the two fan speeds as explained above. The forced air through refrigerant condenser core 14 increases the heat transfer capabilities of the core and likewise increases the performance and efficiency of the core. In a similar fashion, directing air flow into and around the various functional components located in engine compartment 20 provides ventilation of the engine compartment and cooling of the components contained therein thereby likewise improving the life and performance of such components. All of this is accomplished through the use of a single fan 10.

The positioning of fan 10 as described herein serves another important purpose. Sound waves emitted by fan 10 and drive motor 13 towards the front of the machine are attenuated by heat transfer device 14 and any fluid contents thereof, and the duct work surrounding fan 10 and drive motor 13 helps to attenuate noise emitted thereby in the opposite direction. This fan arrangement therefore further helps in reducing noise pollution and meeting tougher noise regulations worldwide.

It is recognized that variations to the operating steps depicted in flow chart 100 could be made without departing from the spirit and scope of the present invention. In particular, steps could be added or some steps could be eliminated. All such variations are intended to be covered by the present invention.

Also, it is preferred that control loop 100 be repeated at a predetermined interval for at least as long as the work machine is operating or until the ignition switch is turned off. This predetermined interval can be based upon a specific predetermined period of time, predetermined incremental changes in engine compartment temperature, or some other parameter or other criteria. In addition, at step 124, ECM 30 can be programmed to either loop back to step 103 and repeat flow chart 100, or ECM 30 could terminate at step 124 and such control loop could be thereafter repeated based upon the predetermined repeat criteria for again triggering the operating steps of flow chart 100.

Other aspects, objects and advantages of the present invention can be obtained from a study of the drawings, the disclosure and the appended claims.

What is claimed is:

1. A system for controlling air flow through a a refrigerant condenser core for an air conditioner and ventilating an engine compartment in a work machine comprising:

a fan positioned adjacent one end portion of the engine compartment downstream from the condenser core;

signal generating means associated with the air conditioner, the signal generating means being operable to output a signal indicative of a desired fan speed based upon operation of the air conditioner;

at least one sensor positioned in the engine compartment for determining the air temperature thereof;

an electronic controller coupled with the signal generating means and with the at least one sensor for receiving signals therefrom, the controller being operable to receive a signal from the signal generating means indicative of a desired fan speed for operation of the air conditioner, and a signal from the at least one sensor indicative of the temperature of the engine compartment;

the controller being further operable to determine a desired fan speed for ventilating the engine compartment based upon the signal received from the at least one sensor indicative of the temperature within the engine compartment; and the controller outputting a signal to the fan to control the speed thereof, the output signal being indicative of the highest fan speed dictated by the signals received from the signal generating means and from the at least one sensor.

2. The control system as set forth in claim 1, wherein the at least one sensor positioned in the engine compartment is positioned proximate to the hottest area associated with the engine compartment.

3. The control system as set forth in claim 1, wherein the engine compartment includes at least one functional component positioned downstream from the fan, the at least one sensor being positioned proximate to the at least one functional component.

4. The control system as set forth in claim 1, wherein the fan is operable between a zero speed and a predetermined maximum speed, the controller determining the desired fan speed for ventilating the engine compartment to be zero if the temperature sensed by the at least one sensor is below a predetermined minimum temperature.

5. The control system as set forth in claim 1, wherein the fan is operable between a zero speed and a predetermined maximum speed, the controller determining the desired fan speed for ventilating the engine compartment to be the maximum fan speed if the temperature sensed by the at least one sensor is above a predetermined maximum temperature.

6. The control system as set forth in claim 1, wherein the fan is operable between a zero speed and a predetermined maximum speed, the controller determining the desired fan speed for ventilating the engine compartment to be proportionately between zero and the maximum fan speed if the temperature sensed by the at least one sensor is between a predetermined minimum and maximum temperature.

7. The control system as set forth in claim 1, wherein the work machine includes an engine and an ignition switch, the ignition switch being operable between at least an on position wherein the engine is allowed to operate and an off position wherein the engine is shutdown, the controller being operable to allow the fan to continue to operate at the last determined desired fan speed if the temperature sensed by the at least one sensor is above a first predetermined temperature, the fan being allowed to continue to operate until the temperature sensed by the at least one temperature sensor falls below a second predetermined temperature.

8. The control system as set forth in claim 1, wherein the control system includes a plurality of sensors positioned at different locations within the engine compartment, the controller being operable to receive a signal from each of the plurality of sensors indicative of the temperature in the engine compartment proximate to the corresponding sensor; and the controller being further operable to determine a fan speed for ventilating the engine compartment based upon the signal received from the sensor indicative of the hottest temperature within the engine compartment.

9. A method for controlling the speed of a fan in a work machine, the work machine including an air conditioner and an engine compartment, the fan being positioned between a condenser core of the air conditioner and one end portion of the engine compartment, the method comprising the steps of:

sensing an air temperature in the engine compartment of the work machine;

determining a fan speed based upon the temperature sensed in the engine compartment;

sensing the operation of the air conditioner;

determining a fan speed based upon the operation of the air conditioner;

comparing the fan speed determined in the step of determining a fan speed based upon the temperature sensed in the engine compartment with the fan speed determined in the step of determining a fan speed based upon the operation of the air conditioner; and setting the speed of the fan to the higher of the fan speeds determined by said comparison.

10. The method as set forth in claim 9, wherein the fan is operable between a zero speed and a predetermined maximum speed, the fan speed determined in the step of determining a fan speed based upon the temperature sensed in the engine compartment being determined in accordance with the following criteria:

if the temperature sensed in the step of sensing a temperature in the engine compartment of the work machine is below a predetermined minimum temperature, the fan speed determined in the step of determining a fan speed based upon the temperature sensed in the engine compartment will be zero;

if the temperature sensed in the step of sensing a temperature in the engine compartment of the work machine is above a predetermined maximum temperature, the fan speed determined in the step of determining a fan speed based upon the temperature sensed in the engine compartment will be the maximum fan speed; and if the temperature sensed in the step of sensing a temperature in the engine compartment of the work machine is between the predetermined minimum and maximum temperatures, the fan speed determined in the step of determining a fan speed based upon the temperature sensed in the engine compartment will be a speed proportionately between zero and the maximum fan speed.

11. The method as set forth in claim 9, wherein the temperature sensed in the step of sensing a temperature in the engine compartment of the work machine step is proximate to the hottest area associated with the engine compartment.

12. The method as set forth in claim 9, wherein the engine compartment includes at least one functional component positioned downstream from the fan, the temperature sensed in the step of sensing a temperature in the engine compartment of the work machine step being proximate to the at least one functional component.

13. The method as set forth in claim 9, wherein a plurality of temperatures are sensed temperature sensed in the step of sensing a temperature in the engine compartment of the work machine at different locations within the engine compartment, and wherein the fan speed determined in the step of determining a fan speed based upon the temperature sensed in the engine compartment is based upon the hottest temperature sensed within the engine compartment.

* * * * *